United States Patent
Kim et al.

(10) Patent No.: US 11,630,726 B2
(45) Date of Patent: Apr. 18, 2023

(54) MEMORY SYSTEM AND OPERATING METHOD THEREOF

(71) Applicant: SK hynix Inc., Gyeonggi-do (KR)

(72) Inventors: Tae Ha Kim, Gyeonggi-do (KR); Jee Yul Kim, Gyeonggi-do (KR); Hyeong Ju Na, Gyeonggi-do (KR); Kwan Su Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 16 days.

(21) Appl. No.: 17/197,599

(22) Filed: Mar. 10, 2021

(65) Prior Publication Data
US 2022/0091932 A1 Mar. 24, 2022

(30) Foreign Application Priority Data
Sep. 22, 2020 (KR) .................. 10-2020-0122474

(51) Int. Cl.
*G06F 11/10* (2006.01)
*G06F 11/07* (2006.01)
*G06F 11/30* (2006.01)
*G06F 3/06* (2006.01)

(52) U.S. Cl.
CPC ........ *G06F 11/1068* (2013.01); *G06F 3/0619* (2013.01); *G06F 3/0652* (2013.01); *G06F 3/0679* (2013.01); *G06F 11/0757* (2013.01); *G06F 11/3037* (2013.01); *G06F 11/3075* (2013.01)

(58) Field of Classification Search
CPC ............ G06F 11/1068; G06F 11/0757; G06F 11/3037; G06F 11/3075; G06F 3/0619; G06F 3/0652; G06F 3/0679
See application file for complete search history.

(56) References Cited

U.S. PATENT DOCUMENTS

| | | | |
|---|---|---|---|
| 10,365,982 B1 * | 7/2019 | Brooks ................. | G06F 16/182 |
| 11,068,165 B2 * | 7/2021 | Sharon ................. | G06F 3/0673 |
| 11,132,244 B2 * | 9/2021 | Tanakamaru ....... | G06F 13/1668 |
| 2005/0060603 A1 * | 3/2005 | Pomaranski ......... | G06F 11/106 |
| | | | 714/6.32 |
| 2008/0183963 A1 * | 7/2008 | He ..................... | G06F 11/1092 |
| | | | 711/E12.001 |
| 2009/0210574 A1 * | 8/2009 | Fleming ............. | G06F 11/0778 |
| | | | 710/19 |
| 2012/0192037 A1 * | 7/2012 | Gibson .............. | G06F 11/1076 |
| | | | 714/E11.034 |
| 2014/0059405 A1 * | 2/2014 | Syu ....................... | G11C 16/04 |
| | | | 711/E12.008 |

(Continued)

FOREIGN PATENT DOCUMENTS

KR 10-2005-0070210 7/2005

*Primary Examiner* — Guy J Lamarre
(74) *Attorney, Agent, or Firm* — IP & T Group LLP

(57) ABSTRACT

Embodiments of the present disclosure relate to a memory system and an operating method thereof. According to the embodiments of the present disclosure, the memory system may completely scan each of one or more target memory blocks among the plurality of memory blocks, once in each scan period to detect an error in data stored in the corresponding target memory block and may block an attempted second scan of each target memory block in a scan period in which the corresponding target memory block has already been scanned until the scan period is completed.

15 Claims, 17 Drawing Sheets

Select target memory block from plurality of memory blocks at each scan period — S1510

Execute scan operation for each target memory block once during 1st scan period — S1520

(56) References Cited

U.S. PATENT DOCUMENTS

| | | | |
|---|---|---|---|
| 2015/0046762 A1* | 2/2015 | Chien | G11C 7/04 |
| | | | 714/721 |
| 2018/0074701 A1* | 3/2018 | Chang | G06F 3/0688 |
| 2019/0155680 A1* | 5/2019 | Yamate | G06F 11/1641 |
| 2020/0019460 A1* | 1/2020 | Cadloni | G11C 29/021 |
| 2022/0019350 A1* | 1/2022 | Karr | G06F 3/0617 |

* cited by examiner

MEMORY SYSTEM AND OPERATING METHOD THEREOF

CROSS-REFERENCE TO RELATED APPLICATION

The present application claims priority under 35 U.S.C. 119(a) to Korean patent application number 10-2020-0122474, filed on Sep. 22, 2020, which is incorporated herein by reference in its entirety.

BACKGROUND

1. Technical Field

Embodiments relate to a memory system and an operating method thereof.

2. Related Art

A memory system, e.g., a storage device, stores data on the basis of a request from a host, such as a computer, a mobile terminal (for example, a smartphone or a tablet), or any of various other electronic devices. The memory system may be a type that stores data in a magnetic disk such as a hard disk drive (HDD), or a type that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory in the memory system. The memory controller may drive firmware for performing a logical operation for controlling such operations.

The memory system may periodically scan a memory block in the memory device in order to detect an error that occurred in the memory device and execute an operation against the detected error. Such a scan operation is performed to ensure stability of the memory system, but performance of such operation may delay processing of a command received by the memory system and thus degrade overall performance of the system.

SUMMARY

Embodiments of the disclosure provide a memory system and an operating method thereof capable of minimizing or eliminating unnecessary scan operations in the process of scanning memory blocks in the memory device.

In one aspect, embodiments of the disclosure may provide a memory system including a memory device including a plurality of memory blocks, and a memory controller in communication with the memory device to control the memory device.

The memory controller may completely scan each of one or more target memory blocks among the plurality of memory blocks, once in each scan period to detect an error in data stored in the corresponding target memory block.

The memory controller may block an attempted second scan of each target memory block in a scan period in which the corresponding target memory block has already been scanned until the scan period is completed.

The memory controller may add an amount of time the memory system is in a sleep mode state to an elapsed time of the first scan period in determining whether the first scan period has been completed.

The memory controller may determine whether each of the plurality of memory blocks is a hot memory block or a cold memory block, and may select one or more cold memory blocks as the one or more target memory blocks.

In this case, the memory controller may determine whether each memory block is a hot memory block or a cold memory block at the time of completion of a first checking period based on whether the corresponding memory block was erased during the first checking period and whether each memory block was erased during a second checking period which occurs immediately before the first checking period.

In another aspect, embodiments of the disclosure may provide an operating method of a memory system including a memory device with a plurality of memory blocks.

The operating method of the memory system may comprise selecting one or more target memory blocks among the plurality of memory blocks at each of plural scan periods.

The operating method of the memory system may comprise executing, during a first scan period of the plural scan periods, a scan operation for detecting an error in data stored in each target memory block once. In this case, the scan operation for each target memory block is controlled such that a subsequent scan operation is not performed on any of the target memory blocks on which a scan operation has been previously executed during the first scan period until the first scan period is completed.

The step of selecting one or more target memory blocks among the plurality of memory blocks may comprise determining, for each of the plurality of memory blocks, whether each memory block is a hot memory block or a cold memory block.

The step of selecting at least one of target memory block from the plurality of memory blocks may comprises selecting each of the target memory blocks from one or more cold memory blocks among the plurality of memory blocks.

In another aspect, embodiments of the disclosure may provide a memory system including a memory device including a plurality of memory blocks and a memory controller for controlling the memory device.

The memory controller may determine whether each of the plurality of memory blocks is a cold memory block, and select at least one cold memory block as a target memory block to be scanned in a set scan period.

The memory controller may determine an actual scan period to include an amount of time of each sleep mode period that occurs during the set scan period.

The memory controller may perform a scan operation for detecting an error in data stored in each target memory block when the measured scan period ends.

According to embodiments of the disclosure, it is possible to minimize unnecessary scan operations in the process of scanning a memory block in the memory device, thereby preventing performance degradation.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
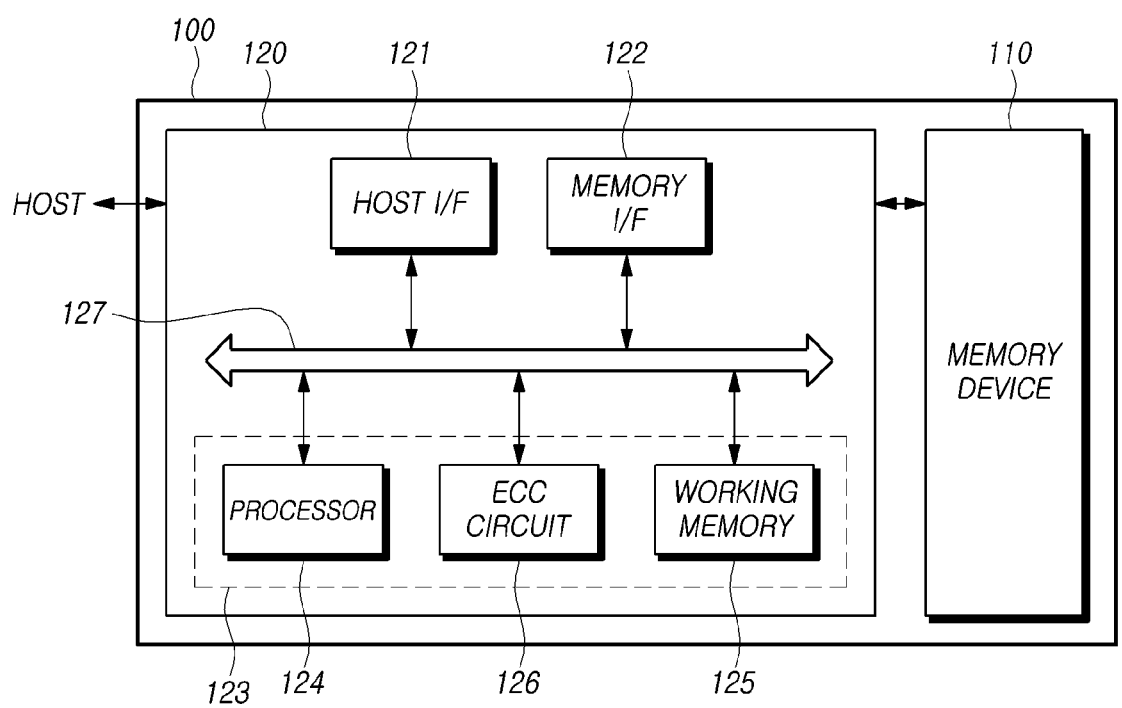
FIG. 1 is a schematic diagram illustrating a configuration of a memory system based on an embodiment of the disclosed technology.

FIG. 1 is a schematic diagram illustrating a configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a set number of memory cells for storing data. The memory device 110 may be configured to operate in response to control signals received from the memory controller 120. Operations of the memory device 110 may include, for example, a read operation, a program operation (also referred to as a "write operation"), and an erase operation.

The memory cells in the memory device 110 are used to store data and may be arranged in a memory cell array. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as any of various types, such as a double data rate synchronous dynamic random access memory (DDR SDRAM), the fourth generation of a low power double data rate (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In other implementations, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device 110 having a physical address corresponding to the received address from the controller 120.

In some implementations, the memory device 110 may perform, among others, a program operation, a read operation, and an erase operation. During the program operation, the memory device 110 may write ("program") data to the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations to be performed on the memory device 110. The background operation may be any of various operations that are implemented to optimize overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host when it performs such a background operation of the memory device 110.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a host interface (I/F) 121, a memory interface (I/F) 122 and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include a flash translation layer (FTL) configured to translate a logical address in the host to a physical address of the memory device 110, a host interface layer (HIL) configured to interpret a command that the host issues to a data storage device such as the memory system 100 and to deliver the command to the FTL, and/or a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data to operate the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the context of this patent document, a "sector" may refer to a data unit that is smaller than the smallest unit for read operations (e.g., page) of a flash memory. Sectors constituting each piece of read data may be mapped based addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than the reference value, the error detection/correction circuit 126 may determine that the corresponding sector is correctable and the corresponding sector can be marked "pass."

The error detection/correction circuit 126 may perform error detection and correction operations successively on all read data. When a sector in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address of uncorrectable sector) regarding each of the sectors deemed uncorrectable to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are illustrated in FIG. 1 by way of example. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Hereinafter, the memory device 110 is described in more detail with reference to FIG. 2.

Figure 2:
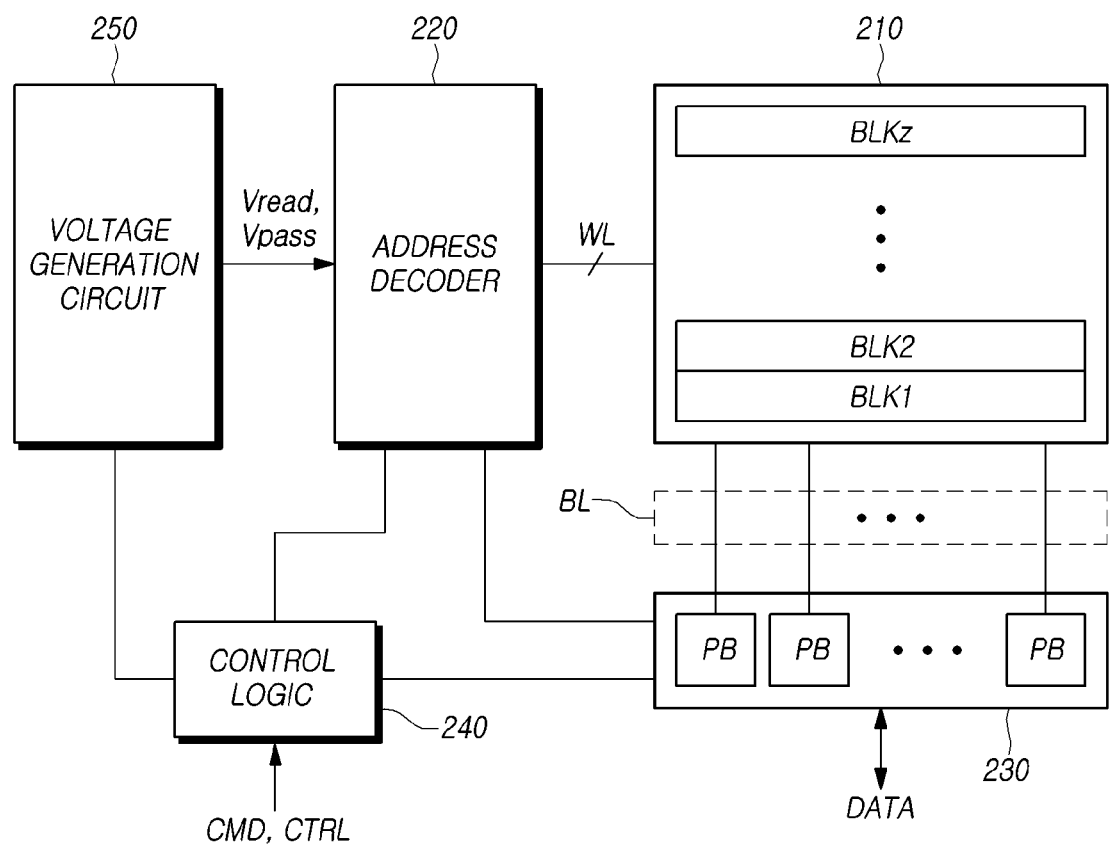
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 may include a memory cell array 210, an address decoder 220, a read/write circuit 230, control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some implementations, may be arranged in a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation on a page by page basis. Addresses received when the read operation and the program operation are requested may include a block address, a row address, and/or a column address.

The address decoder 220 may select one memory block and one word line based on the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may include multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other, second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erase operation may be performed on a memory block by memory block basis.

Figure 3:
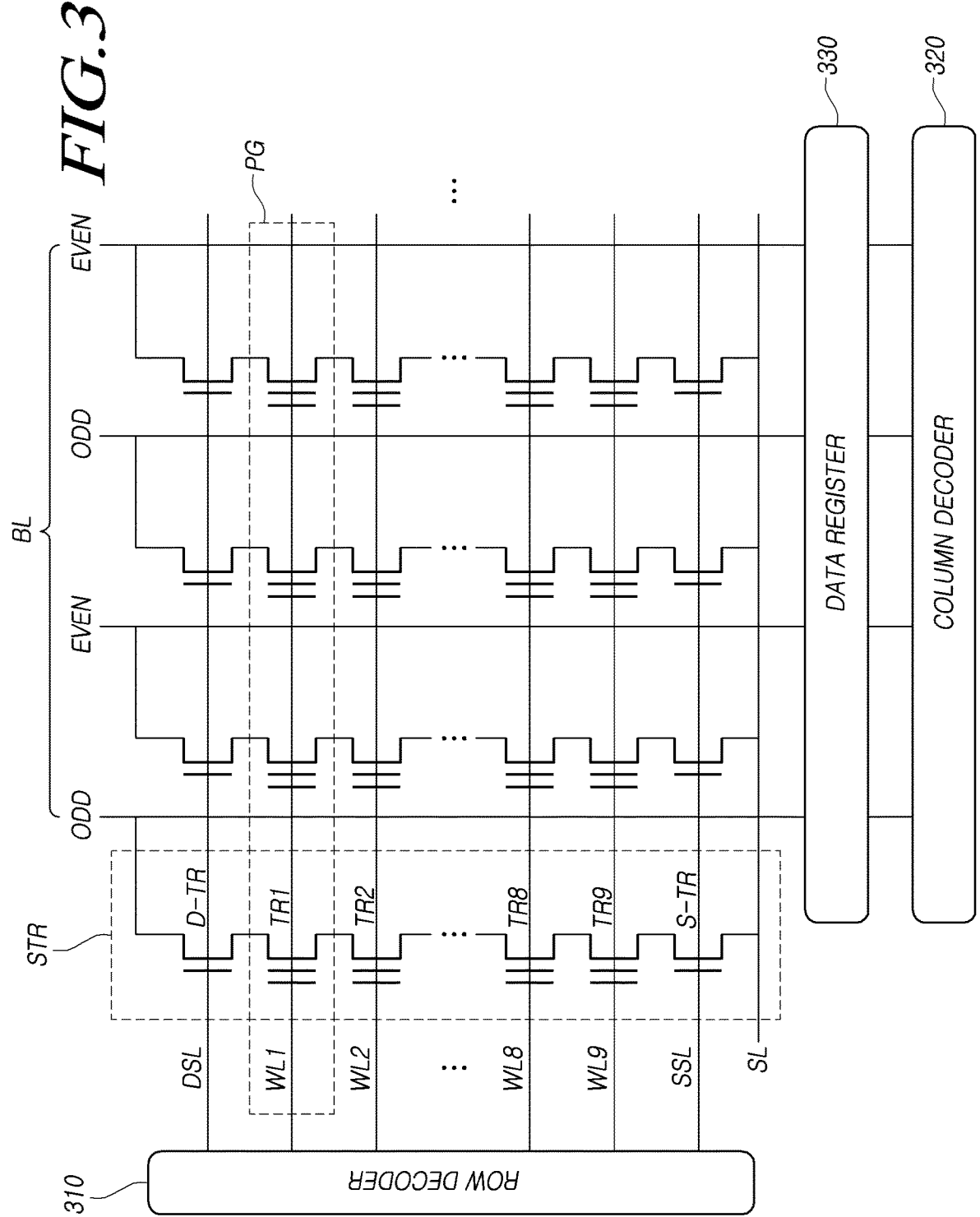
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are concentrated, and an auxiliary area which corresponds to the remaining, non-core area. The auxiliary area includes circuitry for supporting the operations of the memory cell array 210.

The core area may include pages PG and strings STR. In some implementations, multiple word lines WL1-WL9 and multiple bit lines BL are arranged to intersect when viewed from above.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. A page PG is the smallest unit in connection with performing a program operation and a read operation, and all memory cells MC within the same page PG may perform simultaneous operations when a program operation or a read operation is performed.

The multiple bit lines BL may be connected to the column decoder 320. In some implementations, the multiple bit lines BL may be divided into odd-numbered bit lines ODD BL and even-numbered bit lines EVEN BL and arranged in pairs, each of which includes an odd-numbered bit line BL and an even-numbered bit line BL that are coupled in common to a column decoder 320.

The address may be used to access one or more memory cells MC in the core area. The address can be provided through the input/output end to the row decoder 310 and the column decoder 320 to select a corresponding target memory cell. In the context of this patent document, the word "target memory cell" indicates one of the memory cells MC targeted to be accessed by the memory controller or the user. In some implementations, the memory cells MC may be located at respective intersections between the word lines WL1-WL9 connected to the row decoder 310 and the bit lines BL connected to the column decoder 320.

Pages PG in a first direction (for example, a horizontal direction relative to the orientation of the drawing) are connected to a commonly used line referred to as a word line WL, and strings STR in a second direction (for example, a vertical direction relative to the orientation of the drawing) are connected to a common line referred to as a bit line BL. The voltage applied to a memory cell MC down line among memory cells MC connected in series may slightly differ from the voltage applied to memory cell(s) MC up line, due to the voltage drop across the preceding memory cell(s) MC.

In some implementations, the data register 330 plays an important role because all data processing by the memory device 110, including program and read operations, occurs via the data register 330. If data processing by the data register 330 is delayed, all other operations need to wait until the data register 330 finishes the data processing, degrading overall performance of the memory device 110.

Referring to the example illustrated in FIG. 3, in one string STR, multiple transistors TR1-TR9 may be connected to multiple word lines WL1-WL9, respectively. In some implementations, the multiple transistors TR1-TR9 correspond to memory cells MC. In this example, each of the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding string STR to the data register 330. The second selection transistor S-TR is used as a switch circuit that connects the corresponding string STR to the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a voltage (e.g., +20V) to the substrate through a source line SL during an erase operation. The memory system 100 applies a certain voltage to allow both the first selection transistor D-TR and the second selection transistor S-TR to float during an erase operation. As a result, the applied erase voltage can remove electrical charges from the floating gate FG of the selected memory cell.

Figure 4:
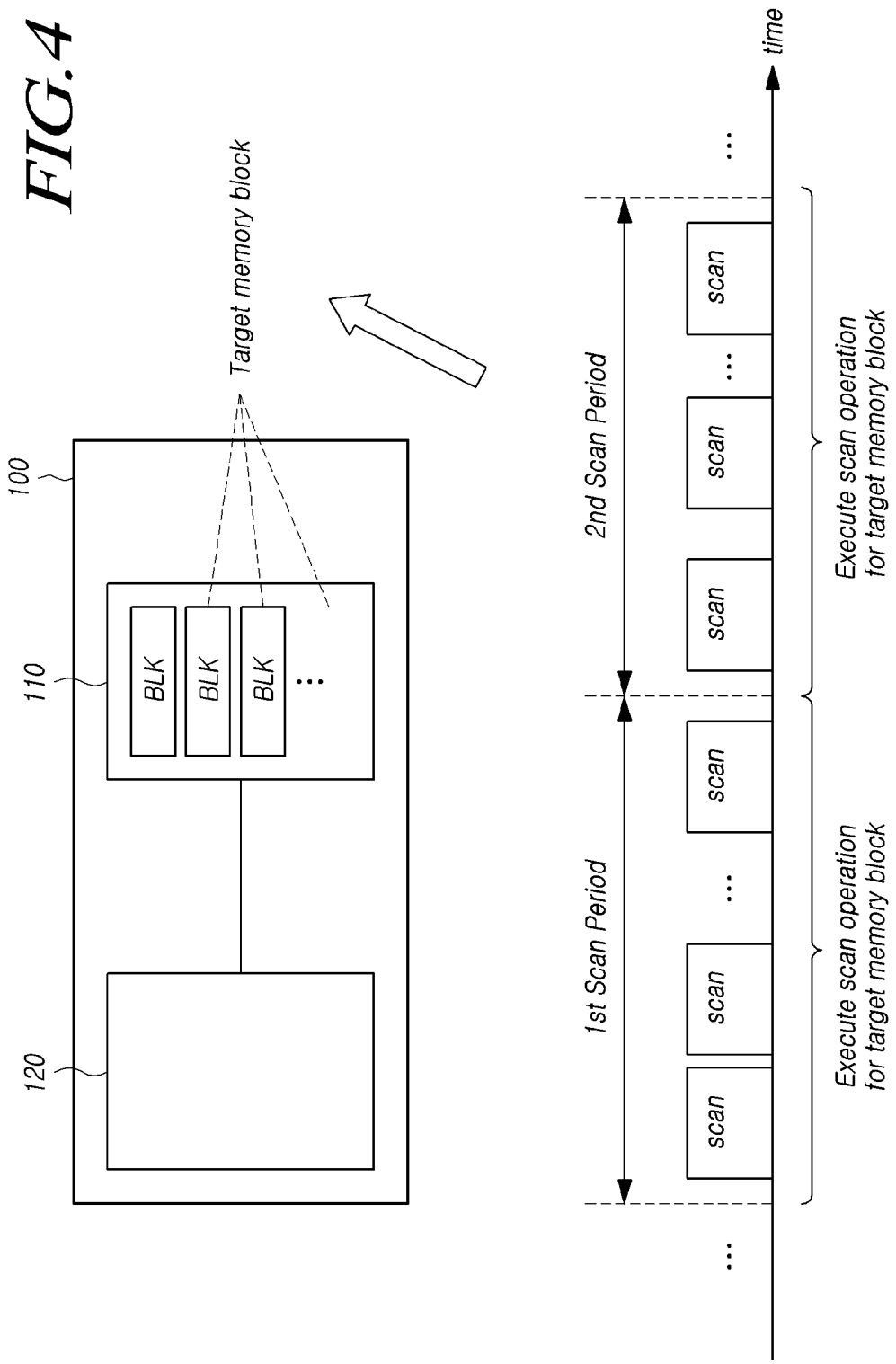
FIG. 4 is a schematic diagram illustrating an operation of the memory system according to an embodiment of the present disclosure.

FIG. 4 is a schematic diagram illustrating an operation of the memory system 100 according to an embodiment of the present disclosure.

Referring to FIG. 4, the memory controller 120 of the memory system 100 may perform the scan operation to detect errors in the data stored in each of one or more target memory blocks among a plurality of memory blocks BLK in the memory device 110 every set scan period (e.g., every 24 hours). The scan operation may be a media scan, or any other suitable scan.

The memory controller 120 may determine whether an error has occurred in data stored in the target memory block(s) through the scan operation. Further, the memory controller 120 may execute an operation for correcting detected error(s). For example, the memory controller 120 may perform an error correction operation on data in which an error has occurred, and may migrate the corrected data to another memory block.

In FIG. 4, the memory controller 120 may perform the scan operation for the target memory block(s) during a first scan period, and may perform a scan operation for the target memory block(s) during a second scan period which is a next scan period after the first scan period. The memory controller 120 may repeat the operation of executing the scan operation for the target memory block(s) every scan period as described above. When performing the scan operation for the target memory block every scan period, the memory controller 120 may scan a particular target memory block at the same relative time sequentially within the scan period.

In some embodiments, the length (time span) of the scan period may be fixed, or they may be different. For example, in FIG. 4, the time span of the first scan period may be different than that of the second scan period.

In addition, the target memory block, which is a target on which a scan operation is executed, may be changed in each scan period. For example, the target memory block in the first scan period may be different from the target memory block in the second scan period. For example, in the case in which the memory system 100 is a slave device that frequently turns on/off in a programmable logic controller (PLC) system, or a client connected to a network device that frequently connects/disconnects, the target memory block may be changed frequently.

Hereinafter, referring to FIG. 5, a method of determining whether or not a scan period is completed in order to perform the scan operation on the target memory block at each set scan period by the memory controller 120 of the memory system 100.

Figure 5:
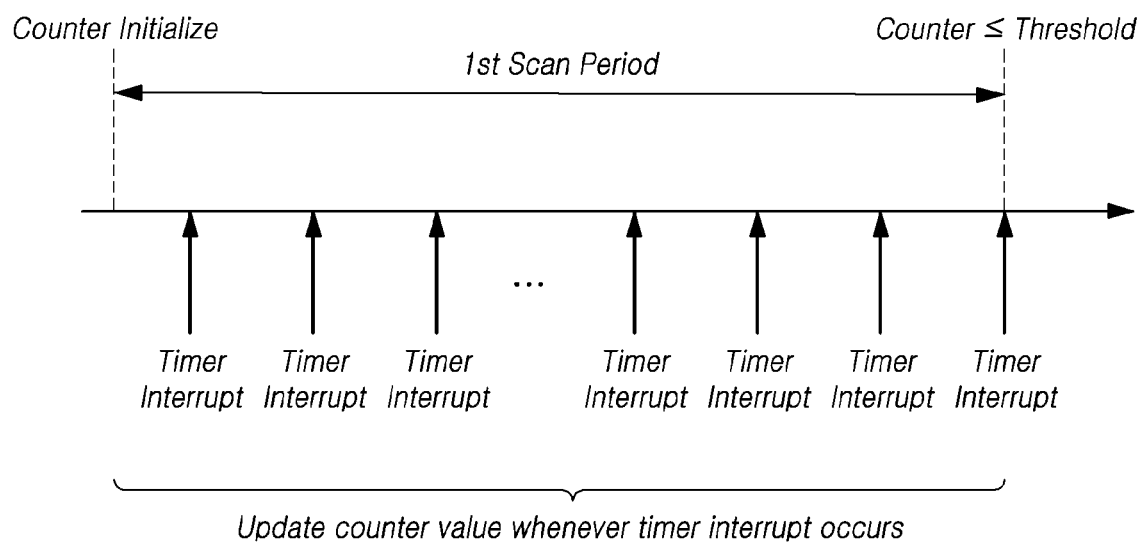
FIG. 5 is a diagram illustrating an example of a method for determining whether a scan period is completed by the memory system according to an embodiment of the present disclosure.

FIG. 5 is a diagram illustrating an example of a method for determining whether a scan period is completed by the memory system 100 according to an embodiment of the present disclosure.

The memory controller 120 of the memory system 100 may update a counter value based on a timer interrupt to determine whether the scan period is completed. For example, the timer interrupt may be periodically generated by the processor 124 of the memory controller 120 according to a set value.

First, the memory controller 120 may initialize the counter to a specific value at the start of the first scan period.

The memory controller 120 may update, e.g., increment, the counter value whenever the timer interrupt occurs. In some embodiments, the timer interrupt may occur, which is typically at regular intervals. Accordingly, since the counter value is also changed based on the time elapsed after the initial time point, the memory controller 120 may check the time elapsed after the start point of the first scan period based on the counter value.

When the timer interrupt occurs, the memory controller 120 may check whether the first scan period is completed based on the updated counter value. For example, when the counter value is less than or equal to a set threshold value, the memory controller 120 may determine that the first scan period is completed due to occurrence of a timeout, and then may execute a specified operation upon completion of the first scan period. In this case, the memory controller 120 may determine again whether the next scan period is completed after reinitializing the counter value.

In the above, the method of the memory controller 120 of the memory system 100 for determining the completion of the scan period has been described.

Hereinafter, a method of selecting the target memory block as a target for executing the scan operation by the memory controller 120 of the memory system 100 during the scan period is described.

Figure 6:
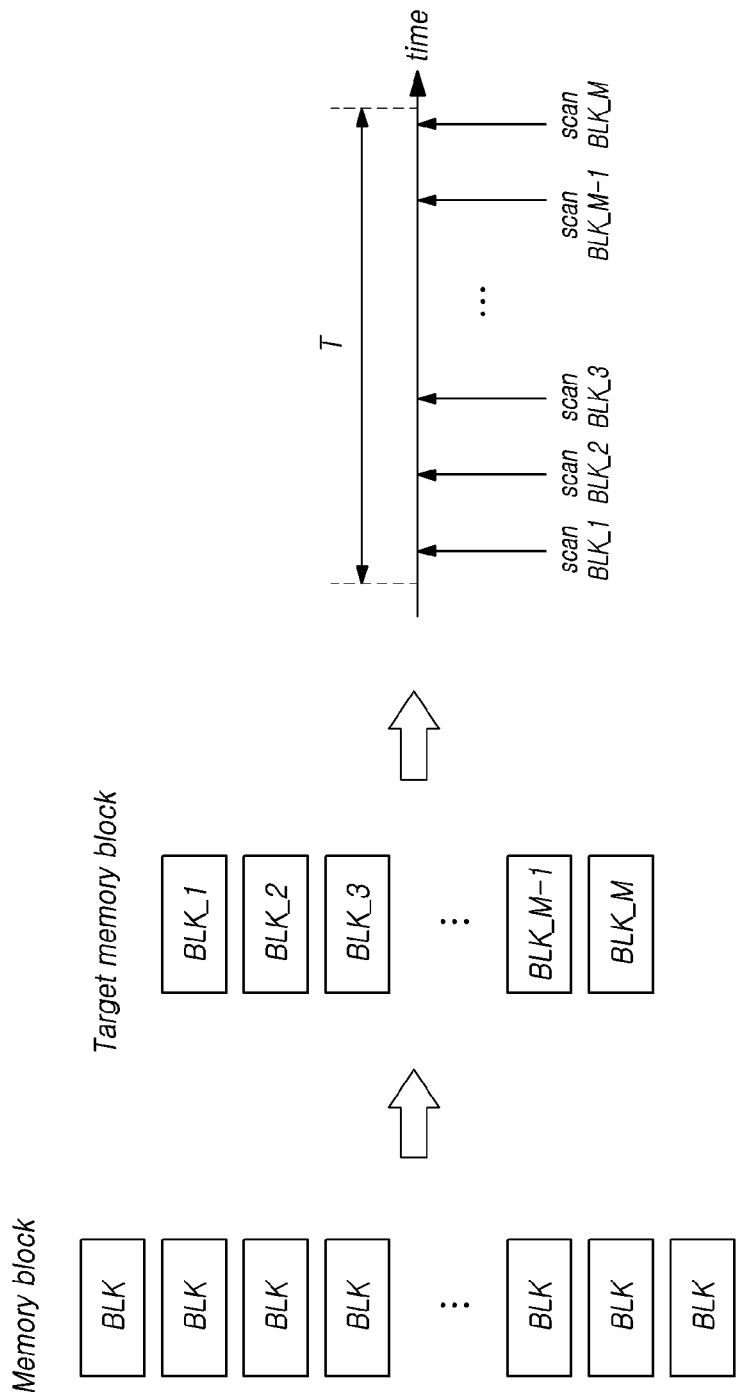
FIG. 6 is a diagram illustrating an operation of selecting the target memory block by the memory system according to an embodiment of the present disclosure.

FIG. 6 is a diagram illustrating an operation of selecting the target memory block by the memory system 100 according to an embodiment of the present disclosure.

As an example, the memory device 110 of the memory system 100 may include a plurality of memory blocks (e.g., N memory blocks BLK (where N is a natural number of 2 or more).

The memory controller 120 of the memory system 100 may select M memory blocks BLK_1, BLK_2, BLK_3, . . . , BLK_M−1, BLK_M among the N memory blocks as the target memory block(s) on which to execute the scan operation. The memory controller 120 may perform the scan operation for the selected target memory block(s) during the scan period T.

In this case, each target memory block may be a closed memory block, which is a memory block in which data writing has been completed, and in which new data is not written until the written data is erased.

To this end, the memory controller 120 may sequentially or randomly select M closed memory blocks BLK_1, BLK_2, BLK_3, . . . , BLK_M−1, BLK_M among the N memory blocks BLK. The number of closed memory blocks among all memory blocks in the memory device 110 may change over time.

Hereinafter, an embodiment in which the memory controller 120 of the memory system 100 performs the scan operation for four (4) target memory blocks is described as an example. Although M=4 in this example, the number of target memory blocks is not limited thereto.

When performing the scan operation for the target memory blocks, the memory controller 120 may perform the scan operation on all M memory blocks during a scan period T, as shown in FIG. 6. The scan period T may be set to accommodate the worst case, in which all memory blocks in the memory device 110 are targets of the scan operation, that is, M=N.

Figure 7:
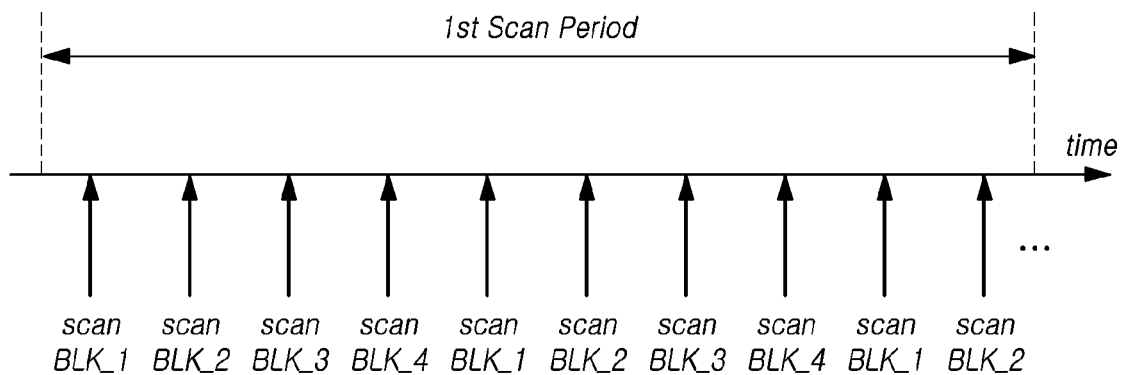
FIG. 7 is a diagram illustrating an example in which a memory system, according to an embodiment of the present disclosure, performs the scan operation for the target memory block.

FIG. 7 is a diagram illustrating an example in which the memory system 100, according to an embodiment of the present disclosure, performs the scan operation for the target memory block.

The number of target memory blocks is less than or equal to the total number of memory blocks in the memory device 110. This is because one or more of the memory blocks in the memory device 110 may be an open memory block (i.e., a block to which data may be written), and no open memory block is selected as a target memory block.

Therefore, when the first scan period is divided by the number of memory blocks in the memory device 110, and scan operations are executed on target memory blocks, one or more of the target memory blocks may be scanned twice. As shown in FIG. 7, after the scan operations for target memory blocks BLK_1, BLK_2, BLK_3, and BLK_4 are executed, the memory controller 120 may again perform the scan operations for target memory blocks BLK_1, BLK_2, BLK_3, and BLK_4.

However, it is not necessary to perform the scan operation more than once for same the target memory block within the same scan period. This is because there is a low possibility that a new defect will occur in a target memory block for which the scan operation has already completed within the same scan period. This is advantageous in that avoids needlessly allocating resources to perform multiple scan operations on the same target memory block, which may exacerbate overall performance degradation of the memory system 100.

Therefore, the memory controller 120 controls the scan operations such that no target memory block is scanned more than once within the first scan period. The memory controller 120 may manage the time when the scan operation is executed for each of memory blocks in the memory device 110, but a lot of resources may be used when the scan operation is executed for each of memory blocks in the memory device 110. Hereinafter, in FIG. 8, an operation of controlling the memory controller 120 to not repeatedly perform the scan operation for a target memory block within a first scan period.

Figure 8:
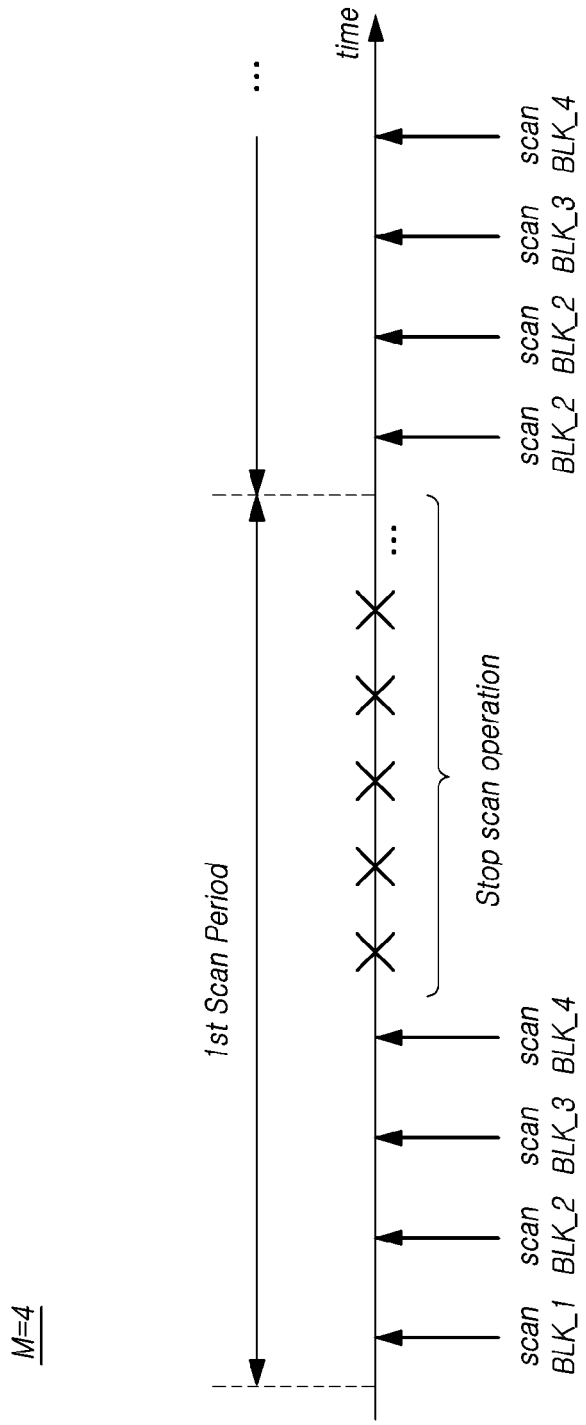
FIG. 8 is a diagram illustrating another example in which the memory system, according to an embodiment of the present disclosure, performs the scan operation for the target memory block.

FIG. 8 is a diagram illustrating another example in which the memory system 100, according to an embodiment of the present disclosure, performs the scan operation for the target memory block.

Referring to FIG. 8, the memory controller 120 of the memory system 100 may sequentially execute the scan operation for target memory blocks BLK_1, BLK_2, BLK_3, and BLK_4 only once. In addition, after the scan operation for each such block is executed, the memory controller 120 may block the scan operation for the target memory blocks BLK_1, BLK_2, BLK_3, and BLK_4 until the first scan period is completed.

In this way, by executing the scan operation for the target memory block once within the first scan period, the memory controller 120 may minimize unnecessary scan operations and thereby preventing the issue that may occur due to repeated scan operations for the same target memory block.

In this case, the memory system 100 accurately measures the scan period. If an error occurs during the measurement process of the scan period and the scan period becomes longer, the time during which a subsequent scan operation for an already scanned target memory block may become longer than expected, and there may be the issue that may not detect an error occurred in the target memory block.

An error may occur in the process of measuring the scan period by the memory system 100 due to various causes. For example, when the memory system 100 is in a sleep mode state. This is described in detail in FIG. 9, the scan period may be incorrectly measured.

Figure 9:
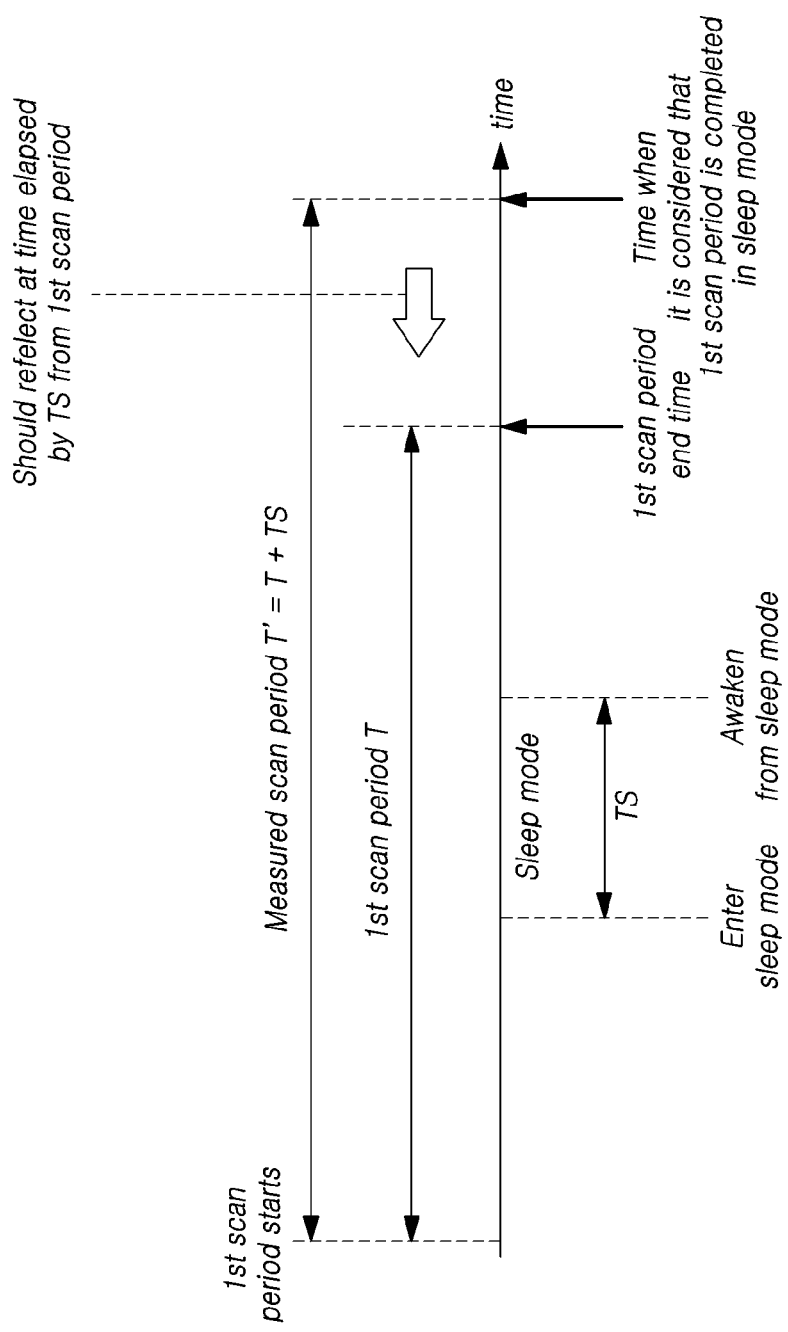
FIG. 9 is a diagram illustrating the operation of reflecting the time in the sleep mode state when determining whether the scan period is completed by the memory system according to an embodiment of the present disclosure.

FIG. 9 is a diagram illustrating an operation of reflecting the time in the sleep mode state when determining whether the scan period is completed by the memory system 100 according to an embodiment of the present disclosure.

Referring to FIG. 9, the memory system 100 may enter the sleep mode while measuring the first scan period. In FIG. 9, it is assumed that the time during which the memory system 100 is in the sleep mode state, that is, the time from entering the sleep mode to awakening from the sleep mode is TS.

In this case, the time T' of the first scan period measured by the memory system 100 may be longer than the time T of the actual first scan period by the TS.

This is because the time when the memory system 100 is in the sleep mode is not reflected in the process of measuring the first scan period. As described in FIG. 5, the memory system 100 may check the counter value when the timer interrupt occurs in order to determine whether the scan period is completed. Therefore, when the memory system 100 enters the sleep mode, the timer interrupt does not occur and the counter value cannot be updated.

In this situation, since the time in which the memory system 100 is in the sleep mode state is not reflected in the elapsed time of the first scan period, an error may occur when measuring the first scan period.

Accordingly, the memory controller 120 may measure the time TS in the sleep mode state, and may reflect the time TS in the sleep mode state when calculating the elapsed time of the first scan period. For example, after awakening from the sleep mode, if the first scan period is already completed when the time TS in the sleep mode state is reflected, the memory controller 120 completes the first scan period and perform the scan operation for each target memory block in the next scan period.

In FIG. 9, the case in which the memory system 100 enters the sleep mode only once during the first scan period is described as an example. However, the above description may be equally applied even when the memory system 100 enters the sleep mode two or more times. In this case, the total time in the sleep mode is reflected in the process of determining whether to complete the first scan period.

Figure 10:
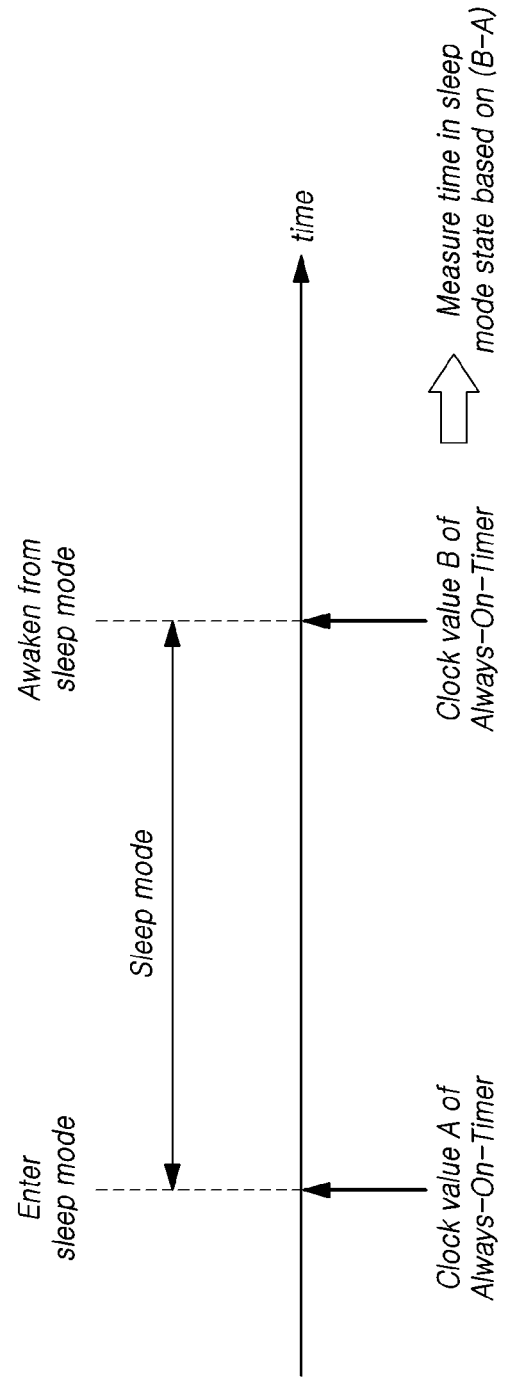
FIG. 10 is a diagram illustrating the operation of measuring the time when the memory system is in the sleep mode state according to an embodiment of the present disclosure.

FIG. 10 is a diagram illustrating the operation of measuring the time when the memory system 100 is in the sleep mode state according to an embodiment of the present disclosure.

Referring to FIG. 10, the memory controller 120 of the memory system 100 may utilize a set timer (e.g., an always-on-timer, which is a timer that also operates in the sleep mode) to measure the time in the sleep mode state. The always-on-timer is used by the module (e.g., sub-processor) to handle events (e.g., receiving a command from the host) that require the memory system 100 to wake up from sleep mode.

In FIG. 10, at the time point when the memory system 100 enters the sleep mode, the clock value of the always-on-timer is A, and at the time point when memory system 100 wakes up from the sleep mode, the clock value of the always-on-timer is B. In this case, the memory controller 120 may check values A and B after waking from the sleep mode, and then measure the time in the sleep mode state based on the difference between value B and vale A (i.e., B-A).

The method in which the memory system 100 measures the scan period has been described.

Hereinafter, another embodiment regarding the criterion for selecting target memory block(s) from among memory blocks in the memory device 110 is described.

Figure 11:
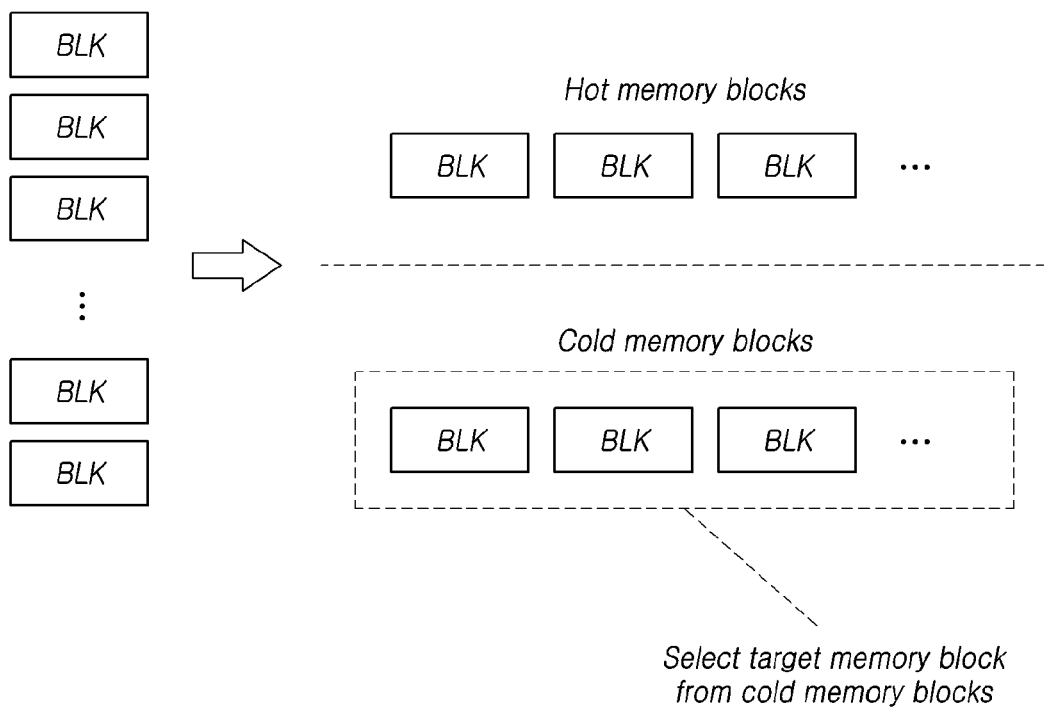
FIG. 11 is a diagram illustrating the operation of classifying the memory block into a hot memory block or a cold memory block by the memory system according to an embodiment of the present disclosure.

FIG. 11 is a diagram illustrating an operation of classifying each memory block as a hot memory block or a cold memory block by the memory system 100 according to an embodiment of the present disclosure.

Referring to FIG. 11, the memory controller 120 of the memory system 100 may classify each of the plurality of memory blocks BLK in the memory device 110 as a hot memory block or a cold memory block, and may execute the scan operation only for each of the cold memory blocks. A hot memory block may mean a memory block in which data is frequently read or written, whereas a cold memory block may mean a memory block in which data is read or written less frequently.

That is, the memory controller 120 may determine, for each of the plurality of memory blocks BLK in the memory device 110, whether each memory block is a hot memory block or a cold memory block. Further, the memory controller 120 may select the target memory block(s) on which to execute the scan operation(s) only from the cold memory blocks.

The reason why the memory controller 120 selects the target memory block(s) from the cold memory blocks and does not select any hot memory block as a target memory block is as follows.

A hot memory block is a memory block in which data has been recently written, and in which there is a high possibility that new data will be written again after the recently written data is soon erased. That is, since not much time has elapsed since data was written to a hot memory block, the possibility that such block may deteriorate due to frequent read operations or retention may be relatively low.

In addition, in the process of erasing previously written data and writing new data, a checking operation may be performed on the data of a hot memory block. Therefore, there may be no need to perform a separate scan operation for the hot memory block.

Hereinafter, a determination operation in which the memory controller 120 determines whether each of the plurality of memory blocks BLK in the memory device 110 is a hot memory block or a cold memory block is described.

For example, the memory controller 120 may, for each of the plurality of memory blocks BLK, determine whether each memory block is a hot or cold memory block at the time of completion of a first checking period based on whether the corresponding memory block is erased during the first checking period and whether the corresponding memory block is erased during a second checking period immediately before the first checking period.

The first and second checking periods are times during which the memory controller 120 checks whether to execute the erase operation for each of the plurality of memory blocks BLK. Each of the first and second checking periods may be different from the above-described scan period.

Figure 12:
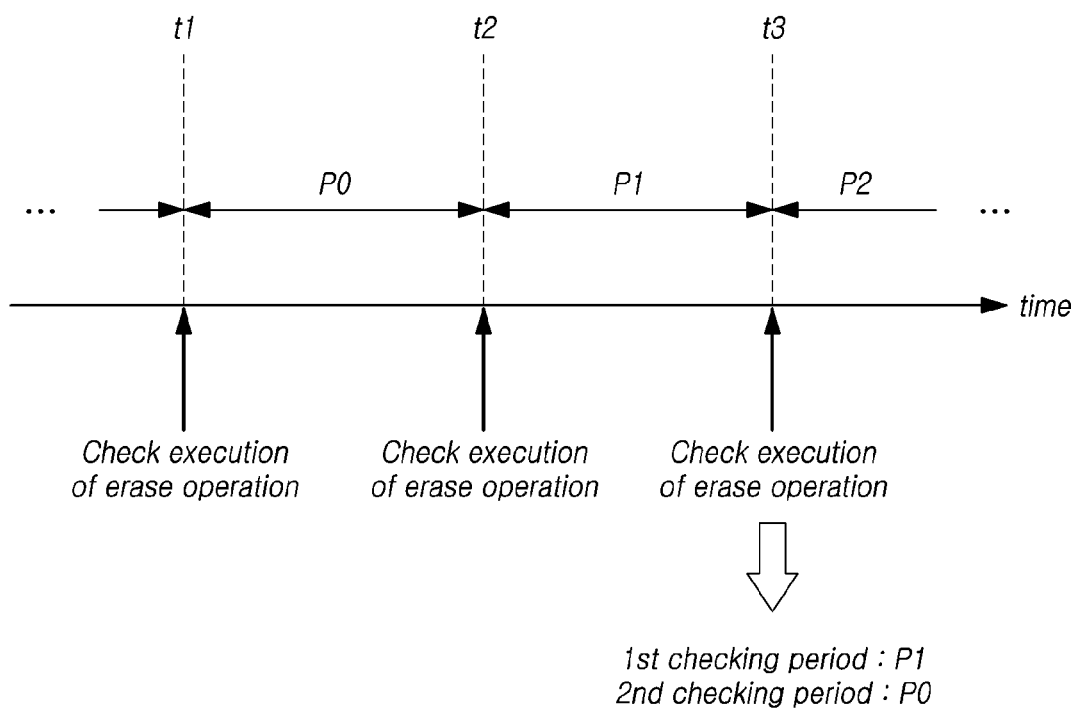
FIG. 12 is a diagram illustrating the checking period in which the memory system, according to an embodiment of the present disclosure, checks whether the erase operation of the memory block is executed.

FIG. 12 is a diagram illustrating the checking period in which the memory system 100, according to an embodiment of the present disclosure, checks whether the erase operation of the memory block has been executed.

Referring to FIG. 12, the memory controller 120 of the memory system 100 may check whether the erase operation has been executed for each of the plurality of memory blocks BLK at each of times t1, t2 and t3.

P0 represents the second checking period from t1 to t2, P1 represents the first checking period from t2 to t3, and P2 represents the checking period from t3 to the next time in the sequence.

At the time that the first checking period ends, the memory controller 120 may, for each of the plurality of memory blocks BLK, determine whether each memory block is a hot memory block or a cold memory block based on whether the corresponding memory block was erased during the first checking period and whether the corresponding memory block was erased during the second checking period immediately before the first checking period.

The memory controller 120 may determine, at time t3, i.e., at the end of the first checking period, whether each memory block is a hot memory block or a cold memory block based on whether the corresponding memory block has been erased during P1 and whether of the corresponding memory block has been erased during P0.

Figure 13:
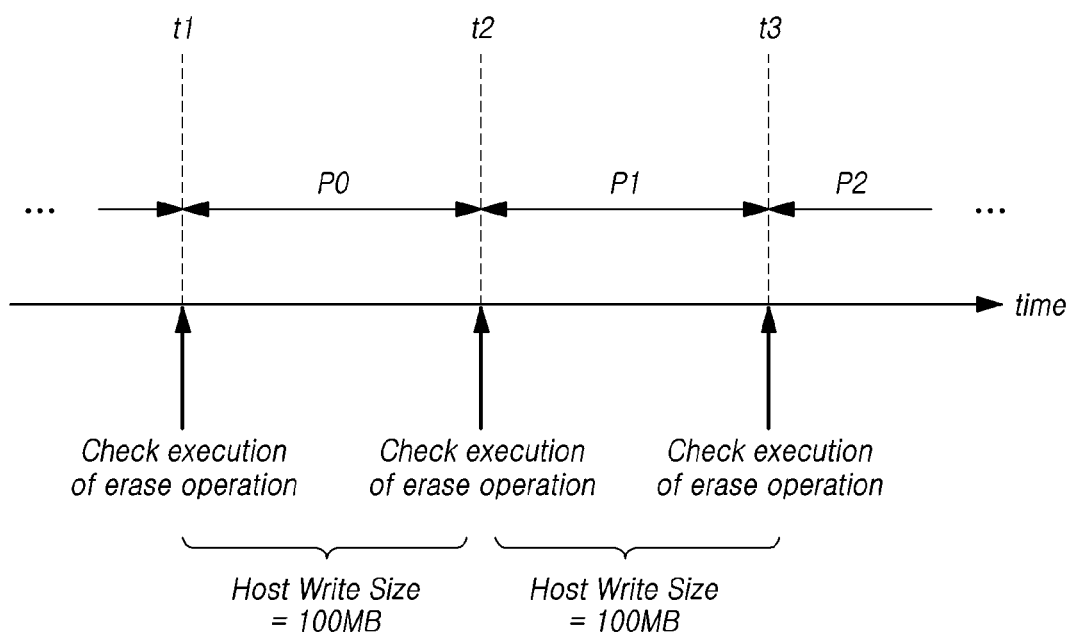
FIG. 13 is a diagram illustrating an example in which a memory system, according to an embodiment of the present disclosure, determines the checking period.

The memory controller 120 may set the first checking period P1 and the second checking period P0 according to various criteria as described in FIG. 13.

FIG. 13 is a diagram illustrating an example in which a memory system 100, according to an embodiment of the present disclosure, determines the checking period of FIG. 12.

In FIG. 13, the memory controller 120 of the memory system 100 may determine the first checking period and the second checking period based on the time point when the data write size requested by the host reaches a set threshold (e.g., 100 MB). In some embodiments, the threshold may be determined according to the characteristics of the memory system 100 (e.g., the number of memory blocks in the memory device 100, the size of each memory block, and the like).

For example, the memory controller 120 may determine that the second checking period P0 ends and the first checking period P1 starts when the data write size requested by the host reaches 100 MB after the second checking period P0 starts. In addition, the memory controller 120 may determine that the first checking period P1 ends when the data write size requested by the host reaches 100 MB after the first checking period P1 starts.

Figure 14:
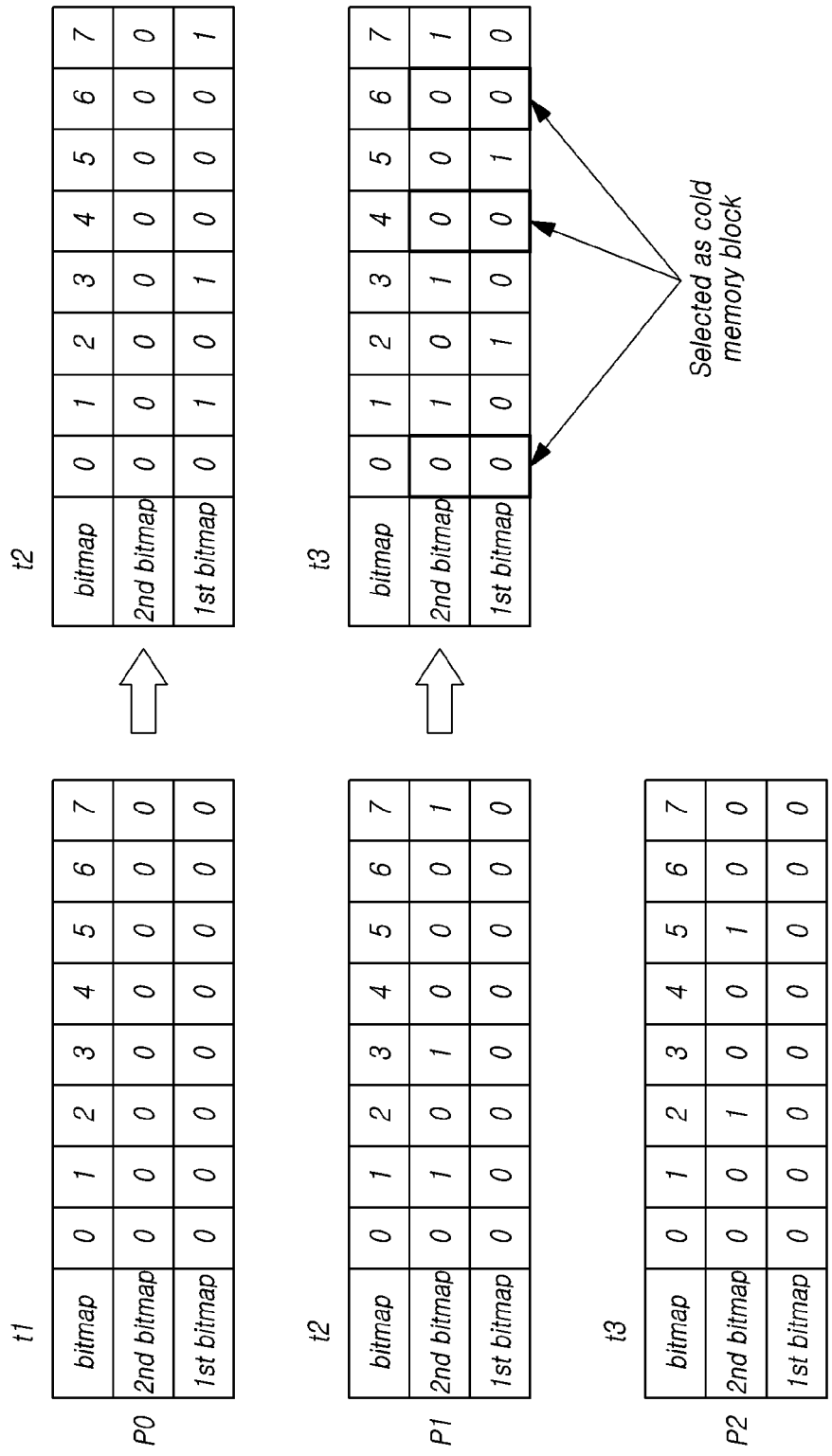
FIG. 14 is a diagram illustrating an example of an operation of selecting a cold memory block by the memory system according to an embodiment of the present disclosure.

FIG. 14 is a diagram illustrating an example of an operation of selecting a cold memory block by the memory system 100 according to an embodiment of the present disclosure.

Referring to FIG. 14, the memory controller may, for each of the plurality of memory blocks, record whether the corresponding memory block has been erased during the first checking period in the first bitmap, and may record whether the corresponding memory block has been erased during the second checking period in the second bitmap.

In this case, the bits of the first bitmap may indicate whether the respective memory blocks have been erased in the first checking period, and the bits in the second bitmap may indicate whether the respective memory blocks have been erased in the second checking period. Corresponding bits in the first and second bitmaps may indicate erase status for the same memory block at different times. One bit value, e.g., 1, may indicate that the corresponding memory block was erased in the applicable checking period, while the other bit value, e.g., 0, may indicate that such memory block was not erased in the applicable checking period. Hereinafter, it is assumed that 1 indicates erased and 0 indicates not erased.

In FIG. 14, it is assumed that the memory controller 120 of the memory system 100 checks whether eight memory blocks have been erased, and the indexes corresponding to each of the eight memory blocks are 0, 1, 2, 3, 4, 5, 6, 7. However, the number of memory blocks and corresponding index values are not limited to this arrangement.

In this example, the first bitmap indicating whether the erase operation of each of the eight memory blocks has been executed in the first checking period is 8 bits, and the second bitmap indicating whether the erase operation has been executed in the second checking period is also 8 bits.

It is assumed that values of all the bits of the first bitmap and the second bitmap are 0 at a time t1 when the checking period P0 starts. In addition, it is assumed that the erase operation for the memory blocks corresponding to indices 1, 3 and 7 has been executed during the checking period P0.

At the time point t2 when the checking period P0 ends, the memory controller 120 may set the bits with indices of 1, 3, and 7 of the first bitmap to 1.

The checking period P0 ends at the time point t2, the next checking period P1 starts. At this time t2, since the value stored in the first bitmap corresponds to the checking period P0, the memory controller 120 may copy the value stored in the first bitmap into the second bitmap, and may reset all bits of the first bitmap to 0.

The memory controller 120 may interchange or replace the first bitmap and the second bitmap with each other when the new checking period starts in order to omit the operation of copying the value(s) stored in the first bitmap into the second bitmap each time the new checking period starts. That is, the memory controller 120 may set the first bitmap in the previous checking period as the second bitmap in the next checking period, and may set the second bitmap in the previous checking period as the first bitmap in the next checking period, thereby omitting the operation of copying the value(s) stored in the first bitmap to the second bitmap.

It is assumed that after the time t2, the erase operation for the memory block corresponding to the indexes of 2 and 5 has been executed during the checking period P1.

At a time point t3 when the checking period P1 ends, the memory controller 120 may set the bits with the indices of 2 and 5 of the first bitmap to 1.

At this time point t3, the memory controller 120 may classify the memory blocks corresponding to the indexes 0, 4 and 6 which have never been erased in the current checking period P1 and the previous checking period P0 as cold memory blocks. In addition, the memory controller 120 may classify the memory blocks corresponding to the indexes 1, 2, 3, 5 and 7 for which the erase operation has been executed at least once in the checking period P1 and the checking period P0 as hot memory blocks.

At time t3, the checking period P1 ends, and the next checking period P2 starts. At this time t3, the memory controller 120 may copy the value(s) stored in the first bitmap to the second bitmap and may reset all bits of the first bitmap to 0, similar to the operation performed at time t2.

Figure 15:
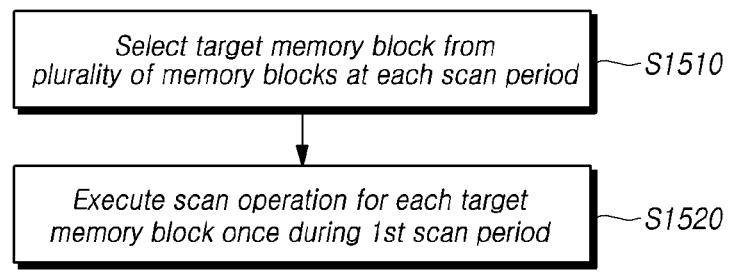
FIG. 15 is a diagram illustrating a method of operating the memory system according to an embodiment of the present disclosure.

FIG. 15 is a diagram illustrating a method of operating the memory system 100 according to an embodiment of the present disclosure.

Referring to FIG. 15, the operating method of the memory system may include selecting one or more target memory blocks from among the plurality of memory blocks BLK in the memory device 110 at each scan period (S1510).

In addition, the operating method of the memory system may include executing, during a first scan period, the scan operation for detecting an error in data stored in each target memory block selected in operation S1510 once (S1520). In this case, the scan operation for the target memory block(s) in which the scan operation has been previously executed during the first scan period may be blocked until the first scan period is completed.

When determining whether the first scan period has been completed, the time in the sleep mode state may be reflected.

Figure 16:
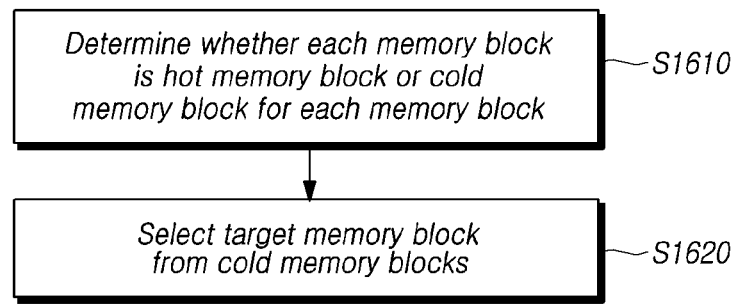
FIG. 16 is a diagram illustrating an example of selecting a target memory block.

FIG. 16 is a diagram illustrating an example of an operation of selecting target memory block(s) S1510.

Referring to FIG. 16, the operation S1510 may include, for each of the plurality of memory blocks BLK in the memory device 110, determining whether the corresponding memory block is a hot memory block or a cold memory block (S1610).

In operation S1610, for each of the plurality of memory blocks BLK, it may be determined whether the corresponding memory block is a hot memory block or a cold memory block at the completion of the first checking period based on whether the corresponding memory block has been erased during the first checking period and whether each memory block has been erased during the second checking period which is a checking period immediately before the first checking period. For each of the plurality of memory blocks BLK, whether such bloc was erased during the first checking period may be recorded in the first bitmap, and whether such block was erased during the second checking period may be recorded in the second bitmap.

In addition, operation S1510 described above may include selecting target memory block(s) from the cold memory blocks among the plurality of memory blocks in the memory device 110 (S1620).

In some implementations, the operation of the memory controller 120 described above may be controlled by the control circuit 123 in such a manner that the processor 124 executes (drives) firmware to cause the memory controller 120 to carry out its various functions programmed in the firmware.

Figure 17:
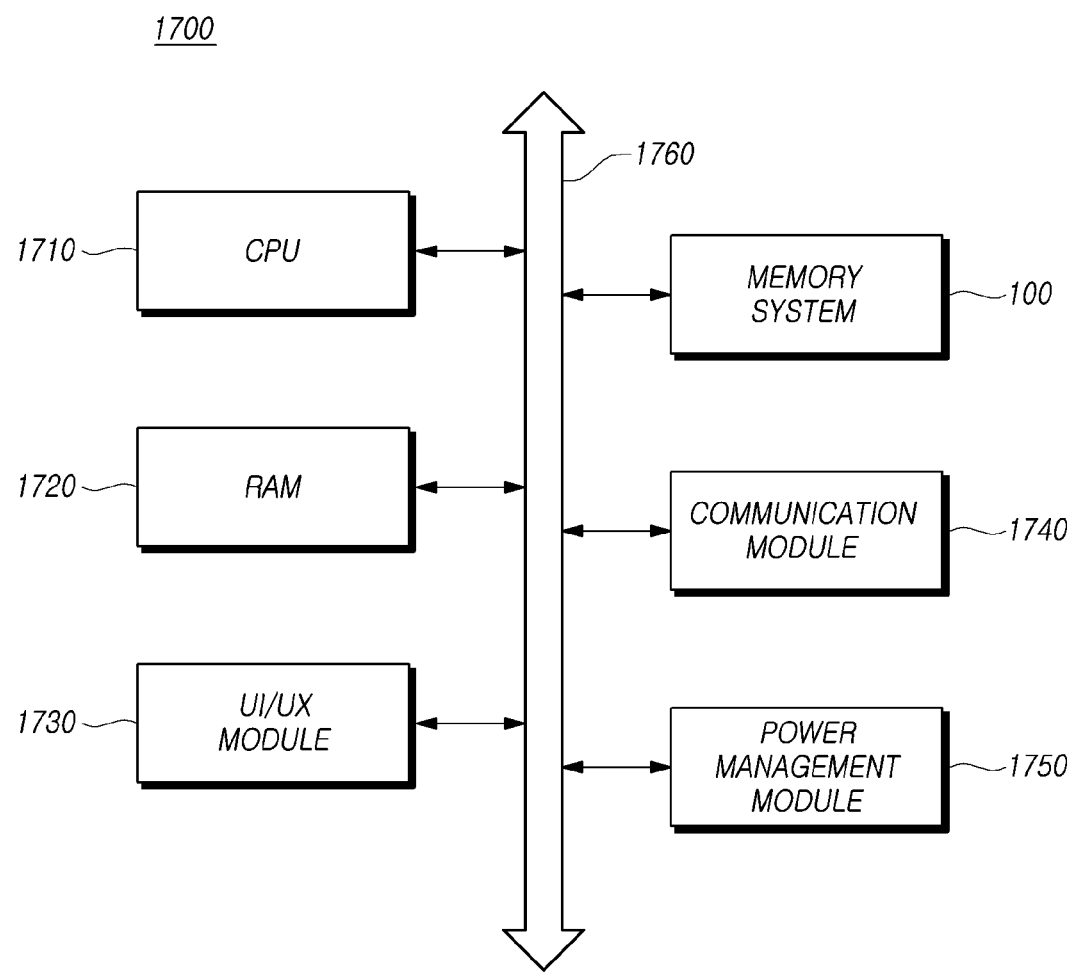
FIG. 17 is a diagram illustrating a configuration of a computing system based on embodiments of the disclosed technology.

FIG. 17 is a diagram illustrating a configuration of a computing system 1700 based on an embodiment of the disclosed technology.

Referring to FIG. 17, the computing system 1700 may include: a memory system 100 electrically connected to a system bus 1760; a central processing unit (CPU) 1710 configured to control the overall operation of the computing system 1700; a random access memory (RAM) 1720 configured to store data and information related to operations of the computing system 1700; a user interface/user experience (UI/UX) module 1730 configured to provide the user with a user environment; a communication module 1740 configured to communicate with an external device as a wired and/or wireless type; and a power management module 1750 configured to manage power used by the computing system 1700.

The computing system 1700 may be a personal computer (PC) or may include a mobile terminal such as a smartphone, a tablet or various electronic devices.

The computing system 1700 may further include a battery for supplying an operating voltage, an application chipset, a graphic-related module, a camera image processor, and a dynamic random access memory (DRAM). The computing system 1700 may include other elements as understood by those skilled in the art.

The memory system 100 may be of a type configured to store data in a magnetic disk such as a hard disk drive (HDD), or of a type configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various storage devices mounted on or embedded in any of various electronic devices.

According to embodiments of the disclosed technology described above, the operation delay time of the memory system may be reduced or minimized. In addition, the disclosed technology can be implemented in a way that reduces or minimizes overhead occurring in the process of calling a specific function. Although various embodiments of the disclosed technology have been illustrated and described, those skilled in the art will appreciate that various modifications, additions and substitutions are possible based on what is described and illustrated herein. The invention encompasses all such modifications, additions and substitutions that fall within the scope of the claims.

What is claimed is:

1. A memory system comprising:
    a memory device including a plurality of memory blocks; and
    a memory controller in communication with the memory device to control the memory device,
    wherein the memory controller is configured to:
        completely scan each of one or more target memory blocks, among the plurality of memory blocks, once in each scan period to detect an error in data stored in the corresponding target memory block; and
        control the target memory blocks wherein a subsequent scan operation is not performed on any of the target memory blocks on which a scan operation has previously executed during the scan period until the scan period is completed.

2. The memory system of claim 1, wherein each target memory block is a closed memory block which is a memory block on which data writing has been completed.

3. The memory system of claim 1, wherein the memory controller determines whether the first scan period has been completed based on a timer interrupt.

4. The memory system of claim 1, wherein the memory controller adds an amount of time the memory system is in a sleep mode state to an elapsed time of the first scan period in determining whether the first scan period has been completed.

5. The memory system of claim 4, wherein the memory controller uses a timer that operates in the sleep mode to measure the time in the sleep mode.

6. The memory system of claim 1, wherein the memory controller determines whether each of the plurality of memory blocks is a hot memory block or a cold memory block, and selects one or more cold memory blocks as the one or more target memory blocks.

7. The memory system of claim 6, wherein the memory controller determines whether each memory block is the hot memory block or the cold memory block at the time of completion of a first checking period based on whether the corresponding memory block was erased during the first checking period and whether each memory block was erased during a second checking period which occurs immediately before the first checking period.

8. The memory system of claim 7, wherein, for each of the plurality of memory blocks, the memory controller records in a first bitmap whether the corresponding memory block was erased during the first checking period, and records in a second bitmap whether the corresponding memory block was erased during the second checking period.

9. The memory system of claim 7, wherein the memory controller determines the first checking period and the second checking period based on the time when data write size requested by a host reaches a threshold size.

10. An operating method of a memory system including a memory device with a plurality of memory blocks, the operating method comprising:
    selecting one or more target memory blocks among the plurality of memory blocks at each of plural scan periods;
    executing, during a first scan period of the plural scan periods, a scan operation for detecting an error in data stored in each target memory block once; and
    controlling the scan operation for each target memory block wherein a subsequent scan operation is not performed on any of the target memory blocks on which a scan operation has previously executed during the first scan period until the first scan period is completed.

11. The operating method of claim 10, wherein whether the first scan period has been completed is determined based on a timer interrupt.

12. The operating method of claim 10, wherein an amount of time in which the memory system is in a sleep mode state is added to an elapsed time of the first scan period in determining whether the first scan period has been completed.

13. The operating method of claim 10, wherein the selecting of one or more target memory blocks among the plurality of memory blocks comprises:
   determining, for each of the plurality of memory blocks, whether each memory block is a hot memory block or a cold memory block; and
   selecting each of the target memory blocks from one or more cold memory blocks among the plurality of memory blocks.

14. The operating method of claim 13, wherein the determining of whether each memory block is a hot memory block or a cold memory block comprises: for each of the plurality of memory blocks, determining whether each memory block is a hot memory block or a cold memory block at the time of completion of a first checking period based on whether the corresponding memory block is erased during the first checking period and whether the corresponding memory block is erased during a second checking period which occurs immediately before the first checking period.

15. The operating method of claim 14, wherein, for each of the plurality of memory blocks, whether the corresponding memory block was erased during the first checking period is recorded in a first bitmap, and whether the corresponding memory block was erased during the second checking period is recorded in a second bitmap.

\* \* \* \* \*